United States Patent
Lim et al.

(10) Patent No.: US 12,117,079 B2
(45) Date of Patent: Oct. 15, 2024

(54) CHAIN GUIDE, CHAIN DRIVE DEVICE, AND TRANSMISSION SYSTEM

(71) Applicant: TSUBAKIMOTO CHAIN CO., Osaka (JP)

(72) Inventors: Sung-Hwan Lim, Osaka (JP); Munehiro Maeda, Osaka (JP); Seigo Ohsawa, Osaka (JP); Yuji Oshima, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/124,463

(22) Filed: Mar. 21, 2023

(65) Prior Publication Data

US 2023/0304565 A1    Sep. 28, 2023

(30) Foreign Application Priority Data

Mar. 24, 2022 (JP) ................... 2022-048735

(51) Int. Cl.
*F16H 7/18* (2006.01)
*F16H 7/06* (2006.01)
*F16H 7/08* (2006.01)

(52) U.S. Cl.
CPC ................. *F16H 7/18* (2013.01); *F16H 7/06* (2013.01); *F16H 2007/0872* (2013.01); *F16H 2007/185* (2013.01)

(58) Field of Classification Search
CPC ...... F16H 7/18; F16H 2007/185; F16H 57/04; F16H 57/05; F16H 7/06; F16H 7/08; F16H 2007/0802; F16H 2007/0872; F16H 2007/0874; F02B 67/06; F01L 1/022; F01L 1/024

USPC .......................................... 474/140
See application file for complete search history.

(56) References Cited

U.S. PATENT DOCUMENTS

| | | | | |
|---|---|---|---|---|
| 5,471,895 | A * | 12/1995 | Ohmon ............. | F01L 1/022 474/134 |
| 5,647,811 | A * | 7/1997 | Mott ................ | F16H 7/0848 474/111 |
| 5,653,652 | A * | 8/1997 | Simpson .......... | F16H 7/08 474/111 |
| 6,062,998 | A * | 5/2000 | Kumakura ........ | F16H 7/18 474/111 |

(Continued)

FOREIGN PATENT DOCUMENTS

| | | | | |
|---|---|---|---|---|
| DE | 19542861 | A1 * | 5/1997 | ............. F16H 57/05 |
| DE | 102016002327 | A1 * | 1/2017 | ............. F01M 9/06 |

(Continued)

OTHER PUBLICATIONS

Extended (Supplementary)European Search Report dated May 26, 2023, issued in counterpart EP Application No. 23162144.2. (8 pages).

*Primary Examiner* — Michael R Mansen
*Assistant Examiner* — Raveen J Dias
(74) *Attorney, Agent, or Firm* — WHDA, LLP

(57) ABSTRACT

To provide a chain guide, chain drive device, and transmission system, with which an amount of lubricating oil supplied to guide surfaces is increased. The chain guide includes an upper additional extension formed to extend from an upper end of a sliding guide part in the guide longitudinal direction and having an oil-recovery guide surface positioned opposite and spaced from the chain.

15 Claims, 3 Drawing Sheets

(56) References Cited

U.S. PATENT DOCUMENTS

| | | | | |
|---|---|---|---|---|
| 6,923,154 B2* | 8/2005 | Gschwindt | ............ | F02F 7/0073 123/195 C |
| 8,137,225 B2* | 3/2012 | Muguruma | ............ | F16H 7/0848 474/111 |
| 8,550,943 B2* | 10/2013 | Kroon | ........................ | F01L 1/02 474/111 |
| 9,394,978 B2* | 7/2016 | Ketterl | ........................ | F16H 7/18 |
| 9,835,232 B2* | 12/2017 | Geibel | ........................ | F16H 7/08 |
| 11,781,622 B2* | 10/2023 | Bang | ........................ | F16H 57/043 474/91 |
| 11,933,400 B2* | 3/2024 | Nyga | ........................ | F01L 1/022 |
| 11,940,047 B2* | 3/2024 | Nyga | ........................ | F02B 67/06 |
| 2004/0149250 A1* | 8/2004 | Gschwindt | ............... | F01L 1/02 123/90.31 |
| 2006/0199689 A1* | 9/2006 | Yoshimoto | ............... | F16H 7/18 474/140 |
| 2009/0258737 A1* | 10/2009 | Muguruma | ............ | F16H 7/0848 474/111 |
| 2010/0248876 A1* | 9/2010 | Kroon | ........................ | F16H 7/18 474/111 |
| 2012/0052996 A1* | 3/2012 | Koiwa | ................. | F16H 7/0848 474/110 |
| 2012/0129636 A1* | 5/2012 | Lee | ........................ | F16H 7/18 474/111 |
| 2012/0135832 A1* | 5/2012 | Muguruma | ............ | F16H 7/0848 474/111 |
| 2013/0095965 A1* | 4/2013 | Nakagawa | ............... | F16H 7/18 474/111 |
| 2014/0256487 A1* | 9/2014 | Ketterl | ........................ | F16H 7/18 474/111 |
| 2016/0102737 A1* | 4/2016 | Geibel | ........................ | F16H 57/05 474/111 |
| 2018/0252301 A1 | 9/2018 | Konno et al. | | |
| 2021/0285537 A1* | 9/2021 | Shimosaka | ........ | F16H 57/042 |
| 2022/0228649 A1* | 7/2022 | Nyga | ........................ | F16H 7/08 |
| 2022/0412452 A1* | 12/2022 | Bang | ........................ | F16H 7/18 |
| 2023/0184311 A1* | 6/2023 | Nyga | ........................ | F16H 7/18 474/140 |
| 2023/0193795 A1* | 6/2023 | Nyga | ........................ | F16H 7/18 474/140 |

FOREIGN PATENT DOCUMENTS

| | | | | |
|---|---|---|---|---|
| DE | 102018130732 A1 * | 5/2020 | ............. | F02B 67/06 |
| JP | 2006-242357 A | 9/2006 | | |

* cited by examiner

CHAIN GUIDE, CHAIN DRIVE DEVICE, AND TRANSMISSION SYSTEM

BACKGROUND OF THE INVENTION

1. Field of the Invention

The present invention relates to a chain guide and a chain drive device installed in a lubricated-atmosphere compartment, and a transmission system.

2. Description of the Related Art

A chain drive device incorporated in a timing system in an engine room of cars is known, in which a chain such as a roller chain is passed over a plurality of sprockets, and chain guides keep correct tension of the chain (see, for example, Japanese Patent Application Publication No. 2006-242357).

SUMMARY OF THE INVENTION

Such a chain drive device is installed in a lubricated-atmosphere compartment. A shortage of lubricating oil supplied to the chain or chain guides will lead to poor sliding performance between the chain and chain guides and cause various detrimental effects such as increased friction resistance of the running chain.

The present invention solves this problem, and it is an object of the invention to provide a simple-structured chain guide, chain drive device, and transmission system, with which an amount of lubricating oil supplied to guide surfaces in sliding contact with a chain is increased.

The above object is achieved by the chain guide according to the present invention, which is installed in a lubricated-atmosphere compartment, for slidably guiding a chain along a chain running direction in a chain running region between an upper sprocket and a lower sprocket, and which includes a sliding guide part having a sliding guide surface that slidably guides the chain, and an upper additional extension formed to extend from an upper end of the sliding guide part in a guide longitudinal direction and having an oil-recovery guide surface positioned opposite and spaced from the chain.

The above object is achieved by the chain drive device according to the present invention, which includes the chain guide, the chain slidably guided by the chain guide, and the upper sprocket and the lower sprocket the chain is passed over.

The above object is achieved by the transmission system according to the present invention, which includes the chain drive device and a block that forms a lubricated-atmosphere compartment in which the chain drive device is set.

According to the invention set forth in claims 1, 7, and 10, the chain guide includes an upper additional extension extending from an upper end of the sliding guide part in a guide longitudinal direction and having an oil-recovery guide surface positioned opposite and spaced from the chain. The oil-recovery guide surface can collect lubricating oil in the lubricated-atmosphere compartment and supply the lubricating oil to the sliding guide surface that slidably guides the chain. Thus the amount of lubricating oil supplied to the sliding guide surface that slidably guides the chain is increased and the sliding properties of the chain can be improved.

According to the invention set forth in claim 2, the oil-recovery guide surface has a portion disposed horizontally opposite a chain meshing region of the upper sprocket. This way, the oil-recovery guide surface can efficiently collect lubricating oil that scatters due to the centrifugal force of the running chain.

According to the invention set forth in claim 3, the oil-recovery guide surface has a portion disposed horizontally opposite an upper half of the upper sprocket, and thus can efficiently collect lubricating oil that scatters due to the centrifugal force of the running chain and supply the oil to the sliding guide surface.

According to the invention set forth in claim 4, the upper end of the sliding guide part is a be able to end, where the chain comes into contact with the chain guide. This way, lubricating oil that scatters due to the centrifugal force of the running chain can be efficiently collected.

According to the invention set forth in claim 5, the upper additional extension 52 has a wall contact part adapted to make contact with an inner wall surface of a block that forms the lubricated-atmosphere compartment. The wall contact part that makes contact with an inner wall surface of the block can be utilized to set the upper additional extension at an appropriate position when installing the chain guide in the lubricated-atmosphere compartment.

According to the invention set forth in claim 6, the oil-recovery guide surface has a portion having a larger width than a width of the sliding guide surface in a lateral direction perpendicular to the chain running direction. Thus the amount of lubricating oil collected by the oil-recovery guide surface can be increased.

According to the invention set forth in claims 8 and 9, the top-side oil-recovery guide surface has a portion located horizontally more outward than a portion located horizontally outermost in a peripheral edge portion in a chain meshing region of the upper sprocket. This way, the lubricating oil collected by the top-side oil-recovery guide surface can be supplied to the chain and to the sliding guide surface of the lower chain guide, and thus the amount of lubricating oil supplied to the chain and to the sliding guide surface of the lower chain guide can be increased.

DESCRIPTION OF THE PREFERRED EMBODIMENTS

A transmission system 10 that is one embodiment of the present invention is described below with reference to the drawings.

Figure 1:
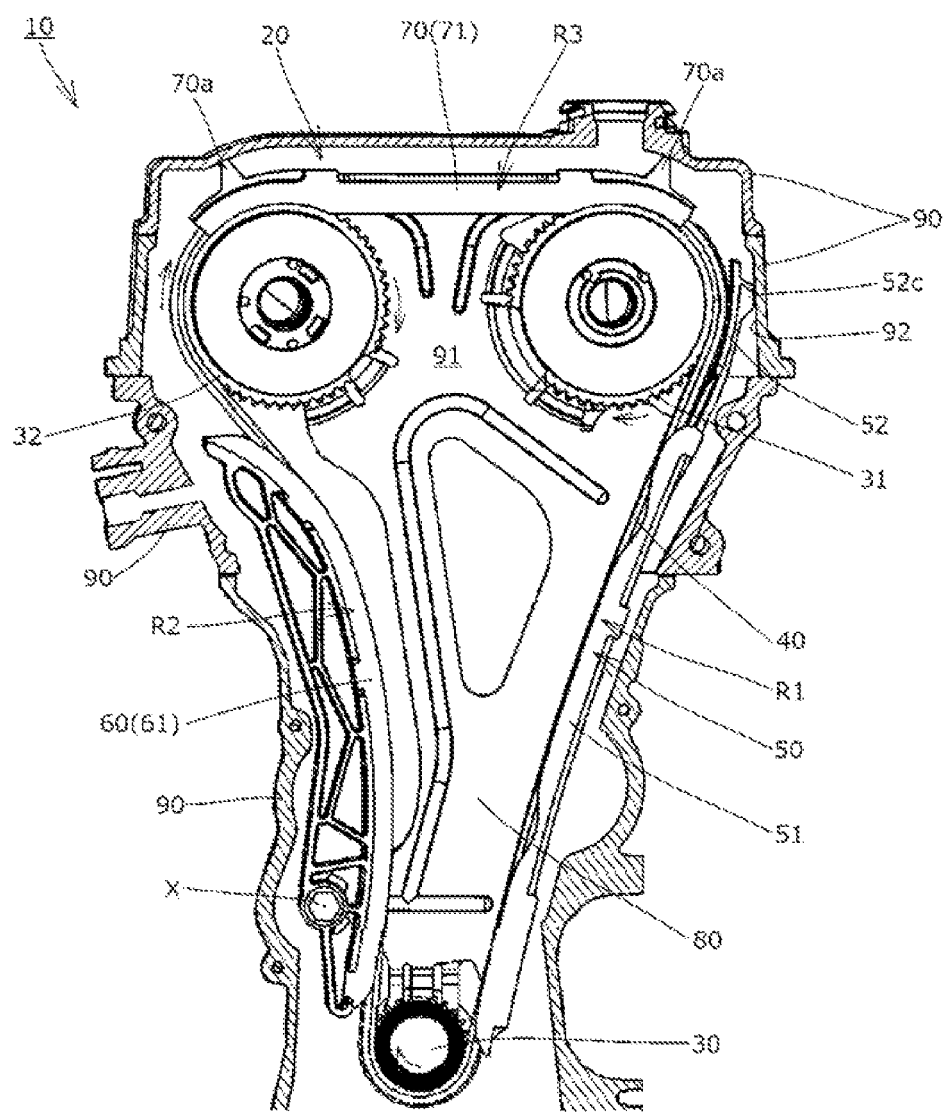
FIG. 1 is an illustrative diagram showing a transmission system according to one embodiment of the present invention.

The transmission system 10 includes, as shown in FIG. 1, a block 90 that forms a lubricated-atmosphere compartment 91 configured as an engine block of a car engine (in other words, a block having an inner wall surface 92 that forms at least part of the inner wall of a lubricated-atmosphere compartment 91, or put differently, a block having a lubricated-atmosphere compartment 91), and a chain drive device 20 installed inside the lubricated-atmosphere compartment 91.

An oil pan (not shown) that is a reservoir of lubricating oil is provided below the block 90 (inside the lubricated-atmosphere compartment 91 of the block). Inside the lubricated-atmosphere compartment 91 is an atmosphere that contains lubricating oil for lubricating various parts of the chain drive device 20 (in other words, a lubricated environment).

Figure 2:
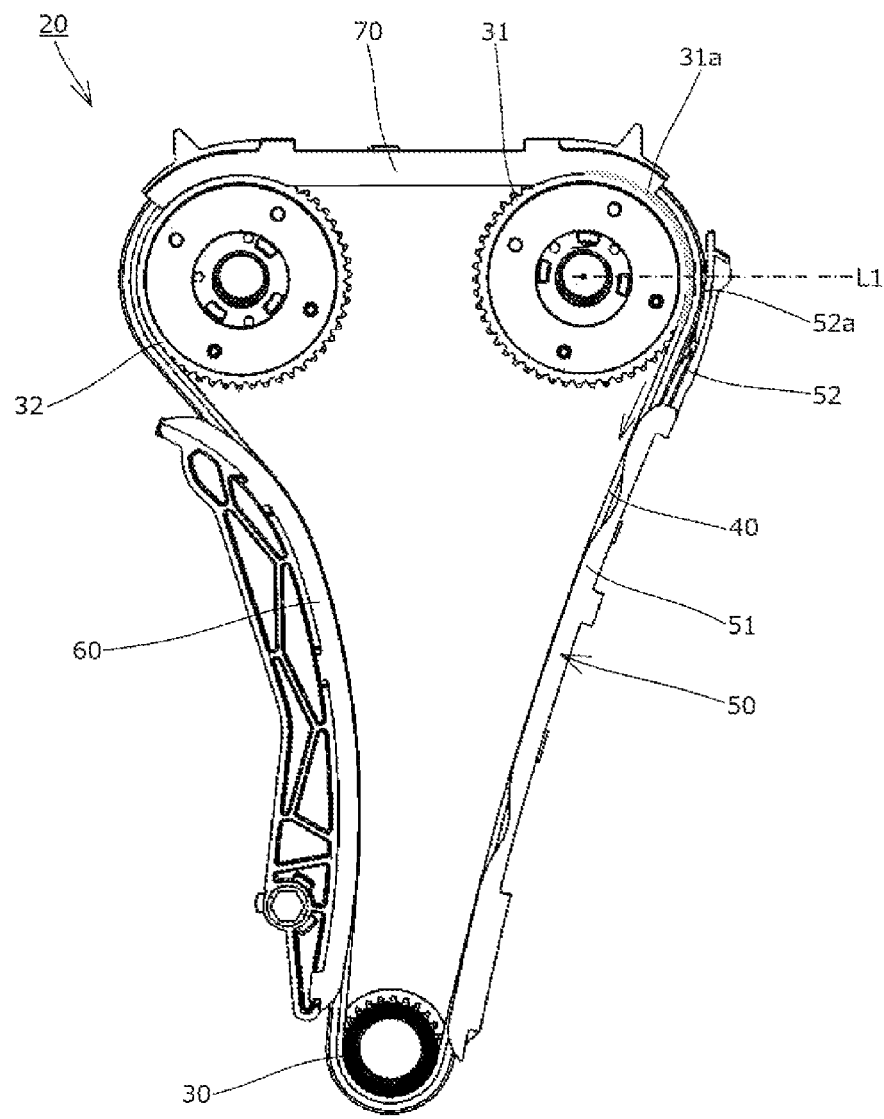
FIG. 2 is an illustrative diagram showing a chain drive device.

The chain drive device 20 is configured as a transmission for a timing system of a car engine and includes, as shown in FIG. 1 and FIG. 2, a plurality of sprockets 30, 31, and 32 made of metal and the like, a metal chain 40 configured as a roller chain and passed over the sprockets 30, 31, and 32, a plurality of chain guides 50, 60, and 70 made of synthetic resin and the like and slidably guiding the chain 40, and a support plate 80 supporting the sprockets 30, 31, and 32 and the chain guides 50, 60, and 70.

As shown in FIG. 1 and FIG. 2, the plurality of sprockets 30, 31, and 32 of the chain drive device 20 include a lower sprocket 30 attached to a crankshaft (not shown) of the engine, and a first upper sprocket 31 and a second upper sprocket 32 located above (higher than) the lower sprocket 30 and attached to camshafts (not shown) of the engine.

The plurality of chain guides 50, 60, and 70 include, as shown in FIG. 1 and FIG. 2, a first chain guide 50 set such as to slidably guide the chain 40 along the chain running direction in a chain running region R1 between the lower sprocket 30 and the first upper sprocket 31, a second chain guide 60 set such as to slidably guide the chain 40 along the chain running direction in a chain running region R2 between the lower sprocket 30 and the second upper sprocket 32, and a top guide 70 set such as to slidably guide the chain 40 along the chain running direction in a chain running region R3 between the first upper sprocket 31 and the second upper sprocket 32.

The first chain guide 50 in this embodiment is configured as a fixed guide set fixedly (not movably) in the block 90 (on the support plate 80 attached to the block 90 in this embodiment) on the tension side of the chain 40 as shown in FIG. 1 and FIG. 2.

The second chain guide 60 in this embodiment is configured as a movable guide (pivotable guide) attached to the block 90 (on the support plate 80 attached to the block 90 in this embodiment) such as to be pivotable around a pivot axis X and pressed against the chain by a tensioner (not shown) on the slack side of the chain 40 as shown in FIG. 1 and FIG. 2.

The top guide 70 in this embodiment is configured as a fixed guide set fixedly (not movably) in the block 90 (on the support plate 80 attached to the block 90 in this embodiment) on the tension side of the chain 40 as shown in FIG. 1 and FIG. 2.

Figure 3:
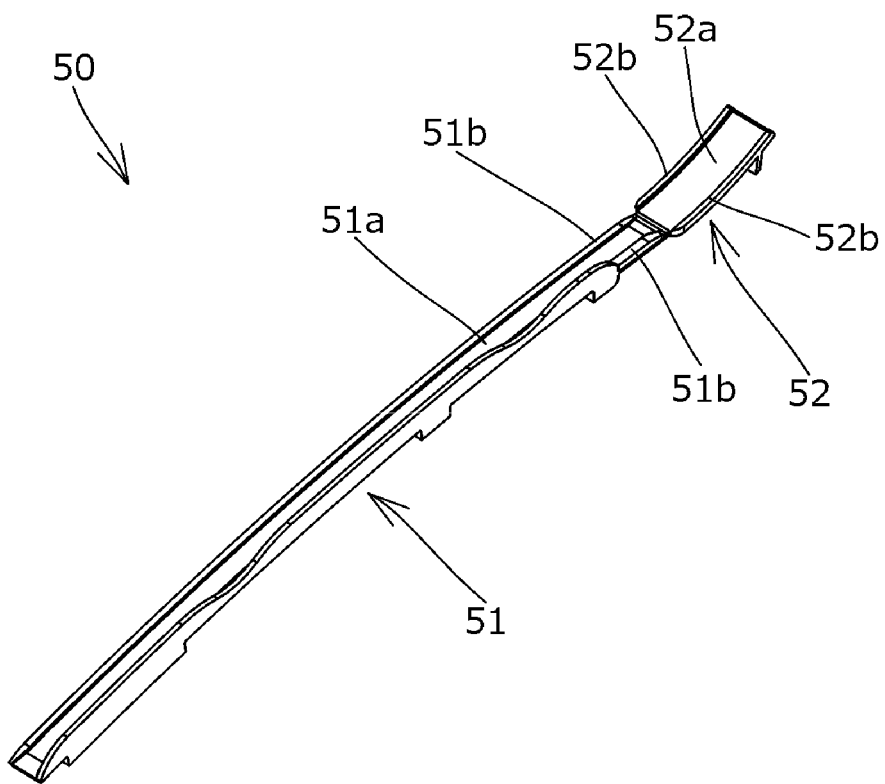
FIG. 3 is a perspective view showing a first chain guide.

The first chain guide 50 includes a sliding guide part 51 configured to slidably guide the chain 40, and an upper additional extension 52 extending upward from an upper end of the sliding guide part 51 in the guide longitudinal direction (longitudinal direction of the first chain guide 50) as shown in FIG. 2 and FIG. 3. The first chain guide 50 is set such that the upper end of the sliding guide part 51 is the chain entrance side end, where the chain 40 comes into contact with the chain guide as shown in FIG. 2 and FIG. 3. In FIG. 1 and FIG. 2, the running direction of the chain 40 is indicated by an arrow.

The sliding guide part 51 includes a sliding guide surface 51a configured to slidably guide the chain 40, and lip parts 51b extending toward the chain 40 on both lateral sides of the sliding guide surface 51a as shown in FIG. 3.

The sliding guide surface 51a is disposed to make contact with the chain 40 from the outer side of the chain track (in the normal running condition).

The upper additional extension 52 includes an oil-recovery guide surface 52a disposed opposite the chain 40, lip parts 52b extending toward the chain 40 on both lateral sides of the oil-recovery guide surface 52a, and a wall contact part 52c adapted to make contact with an inner wall surface 92 of the block 90 facing the lubricated-atmosphere compartment 91 as shown in FIG. 1 and FIG. 3.

The oil-recovery guide surface 52a, which is spaced (separated) from the chain 40 (in the normal running condition), is provided for the purpose of collecting lubricating oil inside the lubricated-atmosphere compartment 91. The lubricating oil collected by the oil-recovery guide surface 52a is guided and supplied to the sliding guide surface 51a continuous with the oil-recovery guide surface 52a by gravity.

The space between the chain 40 and the oil-recovery guide surface 52a may be adjusted such as to serve the function of preventing the chain 40 from jumping (skipping or slipping) the gears of the first upper sprocket 31.

More specifically, the oil-recovery guide surface 52a is configured as follows.

Preferably, the oil-recovery guide surface 52a should have a portion facing a chain meshing region 31a of the first upper sprocket 31 (region where the chain 40 meshes with the first upper sprocket 31, as indicated by a thick solid line in FIG. 2) as viewed in the horizontal direction as shown in FIG. 2.

Moreover, the oil-recovery guide surface 52a should preferably have a portion facing an upper half (part of the upper half) of the first upper sprocket 31 as shown in FIG. 2. In other words, the oil-recovery guide surface 52a should preferably have a portion located higher than a first imaginary line L1 passing horizontally through the rotation center of the first upper sprocket 31 as viewed in the direction of rotation axis of the first upper sprocket 31 (direction perpendicular to the paper plane of FIG. 2).

As shown in FIG. 3, the oil-recovery guide surface 52a is formed to include a portion that is larger in width than the sliding guide surface 51a (widest portion of the sliding guide surface 51a) in the lateral direction perpendicular to the chain running direction. In this embodiment, the entire oil-recovery guide surface 52a is larger in width than the sliding guide surface 51a (widest portion of the sliding guide surface 51a).

From the perspective of collecting as much lubricating oil as possible by the oil-recovery guide surface 52a, it is preferable to form the oil-recovery guide surface 52a even larger in width than the first upper sprocket 31 (larger than the thickness in the direction of rotation axis of the first upper sprocket 31). The upper sprocket 31 is disposed opposite the center in the lateral direction of the oil-recovery guide surface 52a.

The wall contact part 52c is formed on the opposite side from the oil-recovery guide surface 52a of the upper additional extension 52 as shown in FIG. 1 and is adapted to make contact with an inner wall surface 92 of the block 90 facing the lubricated-atmosphere compartment 91. With the first chain guide 50 installed in the block 90, the wall contact part 52c abutting on the inner wall surface 92 of the block 90 causes the first chain guide 50 to slightly flex so that the upper additional extension 52 is set at an appropriate position (in a way that adjusts the space between the chain 40 and the upper additional extension 52).

The second chain guide 60 includes a sliding guide part 61 having a sliding guide surface that slidably guides the chain 40 as shown in FIG. 1. The sliding guide surface is disposed to make contact with the chain 40 from the outer side of the chain track (in the normal running condition).

The top guide 70 includes a top sliding guide part 71 having a sliding guide surface that slidably guides the chain 40, with the sliding guide surface being disposed to make contact with the chain 40 from the outer side of the chain track (in the normal running condition).

The top guide 70 also has a wall contact part 70a adapted to make contact with an inner wall surface 92 of the block 90 as shown in FIG. 1, with the top guide 70 installed in the block 90.

The support plate 80 is configured to accommodate the sprockets 30, 31, and 32 and chain guides 50, 60, and 70 attached thereto, and supports the sprockets 30, 31, and 32 and the chain guides 50, 60, and 70 (as well as the chain 40 passed over the sprockets 30, 31, and 32).

The chain drive device 20 can be installed to the block 90 with ease by setting the support plate 80 with all these members 30, 31, 32, 40, 50, 60, and 70 attached thereto in a preset position inside the lubricated-atmosphere compartment 91 of the block 90.

Next, a variation example of the top guide 70 is described with reference to FIG. 4. The top guide 70 is configured the same as the embodiment described above except for some parts, and therefore description of the configuration other than the different parts will be omitted.

Figure 4:
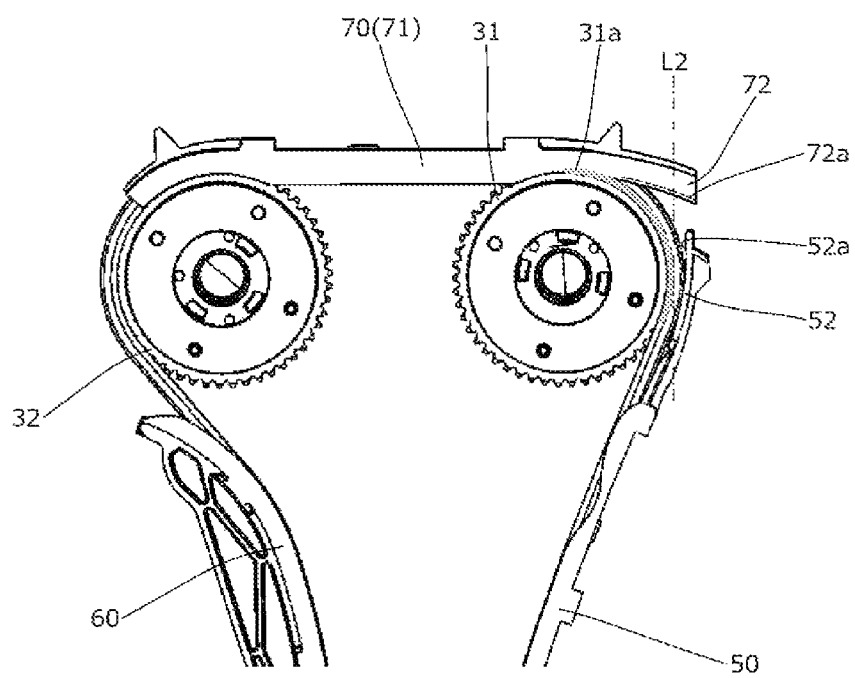
FIG. 4 is an illustrative diagram showing a variation example of the top guide.

In the example shown in FIG. 4, the top guide 70 includes, in addition to the above-mentioned top sliding guide part 71, a top-side additional extension 72 having a top-side oil-recovery guide surface 72a on the side facing the chain 40. The top-side additional extension 72 extends from the top sliding guide part 71 at the end closer to the first upper sprocket 31 in the guide longitudinal direction (longitudinal direction of the top guide 70) so that the top-side oil-recovery guide surface 72a is continuous with the sliding guide surface of the top sliding guide part 71.

The top-side oil-recovery guide surface 72a, which is spaced (separated) from the chain 40 (in the normal running condition), is provided for the purpose of collecting lubricating oil inside the lubricated-atmosphere compartment 91. The lubricating oil collected by the top-side oil-recovery guide surface 72a is guided and supplied to the chain 40 and to the oil-recovery guide surface 52a of the first chain guide 50 by gravity.

The space between the chain 40 and the top-side oil-recovery guide surface 72a may be adjusted such as to serve the function of preventing the chain 40 from jumping the gears of the first upper sprocket 31.

More specifically, the top-side oil-recovery guide surface 72a is configured as follows.

The top-side oil-recovery guide surface 72a has a portion horizontally more outward than a horizontally outermost peripheral edge portion in the chain meshing region 31a of the first upper sprocket 31 as shown in FIG. 4. In other words, the top-side oil-recovery guide surface 72a should preferably have a portion located horizontally more outward than a second imaginary line L2 extending vertically and in contact with the outer peripheral edge of the first upper sprocket 31 in the chain meshing region 31a as viewed in the direction of rotation axis of the first upper sprocket 31 (direction perpendicular to the paper plane of FIG. 4).

Moreover, the top-side oil-recovery guide surface 72a should preferably have a portion located directly above the oil-recovery guide surface 52a of the first chain guide 50 (overlapping the oil-recovery guide surface 52a when viewed vertically) as shown in FIG. 4. This way, the lubricating oil collected by the top-side oil-recovery guide surface 72a can be supplied to the oil-recovery guide surface 52a of the first chain guide 50 below by gravity.

While one embodiment of the present invention has been described in detail, the present invention is not limited to the above-described embodiment. Various transmission systems can be configured by combining the features of the embodiment above and variation examples below, i.e., various design changes may be made without departing from the scope of the present invention set forth in the claims.

For example, while the chain drive device was described as a transmission incorporated in a timing system of a car engine in the embodiment above, the purpose of use of the transmission system is not limited to this specific application.

While the chain drive device in the above-described embodiment has one lower sprocket and two upper sprockets, the chain drive device is not limited to the specific design and may have any form as long as there are at least one lower sprocket and at least one upper sprocket.

In the embodiment described above, the chain guide having an upper additional extension is configured as a fixed guide that is fixedly attached to the block. Instead, an upper additional extension may be formed to a chain guide that is configured as a movable guide (pivotable guide). In other words, the second chain guide in the above-described embodiment may be provided with an upper additional extension in addition to or instead of the upper additional extension of the first chain guide.

In the embodiment described above, the upper end of the sliding guide part from which the upper additional extension extends is the chain entrance side end, where the chain comes in. Instead, the upper end of the sliding guide part from which the upper additional extension extends may be the chain exit side where the chain comes out of the chain guide.

In the embodiment described above, the support plate 80 with the sprockets 30, 31, and 32 and chain guides 50, 60, and 70 attached thereto is mounted to the block 90. The manner by which these components are attached to the block 90 is not limited to the above. The sprockets 30, 31, and 32 and the chain guides 50, 60, and 70 may be directly mounted to the block 90.

In the embodiment described above, the sliding guide part and the upper additional extension of the chain guide are integrally formed (in one piece). Instead, the chain guide may be made up of separate sliding guide part and upper additional extension that are assembled together.

Similarly, while the top sliding guide part and the top-side additional extension are integrally formed (in one piece) in the above-described embodiment, the top guide may be made up of separate top sliding guide part and top-side additional extension that are assembled together.

What is claimed is:

1. A chain drive device comprising:
   a chain guide;
   a chain slidably guided by the chain guide; and
   an upper sprocket and a lower sprocket over which the chain is passed,
   wherein the chain guide is installed in a lubricated-atmosphere compartment and guides the chain along a chain running direction in a chain running region between the upper sprocket and the lower sprocket, the chain guide comprising:
a sliding guide part having a sliding guide surface that slidably guides the chain,
an upper additional extension formed to extend from an upper end of the sliding guide part in a guide longitudinal direction and having an oil-recovery guide surface positioned opposite and spaced from the chain,
a second upper sprocket, and a top guide that slidably guides the chain in a chain running region between the upper sprocket and the second upper sprocket,
the top guide comprising a top-side sliding guide part that slidably guides the chain, and a top-side additional extension formed to extend from an end, which is on the upper sprocket side, of the top-side sliding guide part in the guide longitudinal direction, and having a top-side oil-recovery guide surface positioned opposite and spaced from the chain on a side facing the chain,
the top-side oil-recovery guide surface having a portion located horizontally more outward than a portion located horizontally outermost in a peripheral edge portion in a chain meshing region of the upper sprocket,
wherein the upper additional extension has a wall contact part adapted to be able to make contact with an inner wall surface of a block that forms the lubricated-atmosphere compartment.

2. The chain drive device according to claim 1, wherein the oil-recovery guide surface has a portion disposed horizontally opposite the chain meshing region of the upper sprocket.

3. The chain drive device according to claim 2, wherein the oil-recovery guide surface has a portion disposed opposite an upper half of the upper sprocket.

4. The chain drive device according to claim 1, wherein the upper end of the sliding guide part is a chain entrance side end, where the chain comes into contact with the chain guide.

5. The chain drive device according to claim 1, wherein the wall contact part of the upper additional extension is configured to make contact with an inner wall surface of a side wall of the block.

6. The chain drive device according to claim 1, wherein the oil-recovery guide surface has a portion having a larger width than a width of the sliding guide surface in a lateral direction perpendicular to the chain running direction.

7. The chain drive device according to claim 1, wherein the top-side oil-recovery guide surface has a portion located directly above the oil-recovery guide surface.

8. A transmission system comprising the chain drive device according to claim 1, and a block that forms a lubricated-atmosphere compartment in which the chain drive device is set.

9. A chain drive device comprising:
a chain guide;
a chain slidably guided by the chain guide; and
an upper sprocket and a lower sprocket over which the chain is passed,
wherein the chain guide is installed in a lubricated-atmosphere compartment and guides the chain along a chain running direction in a chain running region between the upper sprocket and the lower sprocket,
the chain guide comprising:
a sliding guide part having a sliding guide surface that slidably guides the chain,
an upper additional extension formed to extend from an upper end of the sliding guide part in a guide longitudinal direction and having an oil-recovery guide surface positioned opposite and spaced from the chain,
a second upper sprocket, and a top guide that slidably guides the chain in a chain running region between the upper sprocket and the second upper sprocket,
the top guide comprising a top-side sliding guide part that slidably guides the chain, and a top-side additional extension formed to extend from an end, which is on the upper sprocket side, of the top-side sliding guide part in the guide longitudinal direction, and having a top-side oil-recovery guide surface positioned opposite and spaced from the chain on a side facing the chain,
the top-side oil-recovery guide surface having a portion located horizontally more outward than a portion located horizontally outermost in a peripheral edge portion in a chain meshing region of the upper sprocket.

10. The chain drive device according to claim 9, wherein the oil-recovery guide surface has a portion disposed horizontally opposite the chain meshing region of the upper sprocket.

11. The chain drive device according to claim 10, wherein the oil-recovery guide surface has a portion disposed opposite an upper half of the upper sprocket.

12. The chain drive device according to claim 9, wherein the upper end of the sliding guide part is a chain entrance side end, where the chain comes into contact with the chain guide.

13. The chain drive device according to claim 9, wherein the oil-recovery guide surface has a portion having a larger width than a width of the sliding guide surface in a lateral direction perpendicular to the chain running direction.

14. The chain drive device according to claim 9, wherein the top-side oil-recovery guide surface has a portion located directly above the oil-recovery guide surface.

15. A transmission system comprising the chain drive device according to claim 9, and a block that forms the lubricated-atmosphere compartment in which the chain drive device is set.

* * * * *